United States Patent [19]

Cree et al.

[11] Patent Number: 4,817,018

[45] Date of Patent: Mar. 28, 1989

[54] ELECTRONIC CALENDARING METHOD WHICH PROVIDES FOR AUTOMATIC ASSIGNMENT OF ALTERNATES IN REQUESTED EVENTS

[75] Inventors: Charles M. N. Cree; Grady J. Landry; Keith J. Scully, all of Austin, Tex.; Harinder S. Singh, Boca Raton, Fla.

[73] Assignee: International Business Machines Corporation, Armonk, N.Y.

[21] Appl. No.: 8,038

[22] Filed: Jan. 29, 1987

[51] Int. Cl.⁴ .............................................. G06F 15/40
[52] U.S. Cl. .................................... 364/518; 364/521; 340/706
[58] Field of Search .............................. 368/29, 10, 43; 340/706, 717; 364/521, 200 MS File, 518, 401, 407

[56] References Cited

U.S. PATENT DOCUMENTS

| | | | |
|---|---|---|---|
| 4,194,196 | 3/1980 | Mohiuddin | 340/711 |
| 4,591,840 | 5/1986 | Curtis et al. | 340/706 |
| 4,626,836 | 12/1986 | Curtis et al. | 340/706 |
| 4,645,238 | 2/1987 | Vincent et al. | 283/67 |

OTHER PUBLICATIONS

Rothfeder J. "Time is of the Essence" Personal Computing Jun. 1983-pp. 56-61.
Sudyam B. "Time Management Bussiness in its Finest Hour" Personal Computing-3/82-pp. 34-40.
Bourne S. R. "The UNIX System" Bell Laboratories pp. 19-21 Addison-Wesley Publishing Company.

*Primary Examiner*—Gary V. Harkcom
*Assistant Examiner*—Phu K. Nguyen
*Attorney, Agent, or Firm*—Richard E. Cummins

[57] ABSTRACT

An electronic calendaring method for use in a data processing system that has a plurality of interactive type work stations (terminals or personal computers) connected directly or indirectly to a host processor. The method assists a calendar owner who receives a notice at his work station requesting his involvement in a future event that is being calendared by another calendar owner on the system, to manually or automatically designate in the reply a temporary alternate to attend the meeting being calendared or a permanent alternate to attend all future meetings without affecting his status in the system as a receipient of the meeting notice.

10 Claims, 4 Drawing Sheets

```
ENTER THE RESPONSE INITIATOR(S)    (Pick one or more)
         MEETING NAME :
   MEETING CALLERS'NAME:
             USER ID:
           SYSTEM ID:
   USER DEFINED FIELD:
 USER DEFINED PRIORITY:

ENTER THE RESPONSE ___   0 = No Action
                         1 = Confirmed (will attend)
                         2 = Tentative (nay attend)
                         3 = Not Attending
                         4 = User Acknowledge (acknowledge invitation)
                         5 = Alternate (the response is for an alternate)
ENTER THE ALTERNATE:
         NAME:
       USER ID:
     SYSTEM ID:
POSTAL ADDRESS:
IS THIS PERMANANT?

PF1=Help   PF3=Cancel   PF11=Add One Line
         PF9=File   PF12=File and Display the next Auto Response Template
```

FIG. 3

```
MOVE THE CURSOR TO EACH SELECTION OR  KEY  THE ITEM  DIRECTLY  AND  HIT  ENTER
                                            Month            Year
       1. Calendar Entry, Meeting,                            1  2
          Appointment, Trigger,              3  4  5  6  7  8  9
          Note, Vacation,                   10 11 12 13 14 15 16
          Holiday, Offsite,                 17 18 19 20 21 22 23
          Not Normal Work Hours             24 25 26 27 28 29 30
                                            31
       2. View Select                       Month             Year
                                               1  2  3  4  5  6
       3. Composite Calendar                 7  8  9 10 11 12 13
                                            14 15 16 17 18 19 20
       4. Conference Room                   21 22 23 24 25 26 27
                                            28 29 30
       5. Automatic Response Command:

PF1=Help    PF2=Return to System
```

FIG. 4a

MOVE THE CURSOR TO EACH SELECTION OR KEY THE ITEM DIRECTLY THEN HIT ENTER
Classification List: 1 Meeting  2 Appointment  3 Offsite  4 Vacation  5 Holiday
                    6 Note  7 Not Normal Work Hours CLASSIFICATION: 1   (Select one classification number from the above list)
USER DEFINED FIELD _____ (8 characters)
PRIORITY  02   (1=highest,10=lowest)
EVENT IDENTIFIER: D35 MEETING A1
MEETING/APPOINTMENT INFORMATION:
        Date 10/07/86     Start Time:1:15 PM    End Time: 5:00 PM
        Date 10/09/86 R2  Start Time:8:30 PM    End Time: 5:00 PM
     (Rx after Date will repeat the event at the same time, x number of days)
     Names List : D35 NAMES A1
        Caller : TOM ROBERTS
       Subject : 1987 Budget
         Place : Conference Room 128F
       Details :

PF1=Help   PF3=Cancel  PF5=Send Notice  PF6=Begin Search
  PF8=Next Screen(Security, Status, Trigger)  PF9=File  PF11=Add One Line

FIG. 4b

MOVE THE CURSOR TO EACH SELECTION OR KEY THE ITEM DIRECTLY AND HIT ENTER

SECURITY:      Public   Shared    Private
    (pick one)
  STATUS:        Tentative       Confirmed
    (pick one)
  TRIGGER:       Message    Audio    Process
    (All three may be picked)
     Date: 10/07/86     Time: 1:00 PM
     Date: 10/09/86     Time: 8:00 AM
  (PF11 will scroll and add additional Date Lines while on the Date line)
  (Rx after Date will repeat the event at the same time, x number of days)
     Names List: D35/AUSVM1 (Enter The Notification List VNET Address)
     Message   : The department meeting starts in 15 minutes
                 (PF11 will add one line)
     Process   : INVEST01/AUSVM1   Enter The Process VNET Address
                 Pick up these calculations before the Budget Meeting TRIGGER FIXED OR FLOAT?      Fixed      Float
    (pick one)
     Float with Event Identifier: D35 MEETING A1
    (If this event moves, the trigger will be moved to the same relative time)

PF1=Help   PF3=Cancel  PF5=Send Notice PF6=Begin Search
  PF7=Previous Screen PF8=Next Screen  PF9=File  PF10=Add One Line

FIG. 4c

ELECTRONIC CALENDARING METHOD WHICH PROVIDES FOR AUTOMATIC ASSIGNMENT OF ALTERNATES IN REQUESTED EVENTS

FIELD OF INVENTION

This invention relates in general to electronic methods, and in particular, to a calendaring method in which replies to invitations to participate in calendar events permit the invitee to designate an alternate.

CROSS-REFERENCES TO RELATED APPLICATIONS

1. Co-pending application Ser. No. 008,034 filed concurrently herewith, entitled "Method For Concurrently Displaying Entries From a Plurality of Different Electronic Calendars Based on Interactively Entered Criteria," and assigned to the assignee of the present application is directed to an electronic calendaring method in which a calendar owner can display a set of calendar entries from different calendars which have an interrelationship that the user defines by data that is entered into the system interactively.

2. Co-pending application Ser. No. 008,039 filed concurrently herewith, entitled "Electronic Calendaring Method to Establish Calendar Floating Triggers for Calendared Events and Processes" and assigned to the assignee of this application is directed to an electronic calendaring method in which a calendar owner can selectively trigger a predefined action and response to detecting one or more criteria related to the calendar event that has previously been defined and entered into the system.

3. Co-pending application Ser. No. 008,249 filed concurrently herewith, entitled "Method For Automatically Reconciling Entries on Two Copies of Independently Maintained Electronic Calendars," and assigned to the assignee of this application is directed to an electronic calendaring method in which a calendar owner who keeps a detached personal copy of his master calendar can automatically reconcile the calendar entries that have been made on each calendar copy, independently of the other since the last time the detached copy was made and interactively resolve calendar event conflicts.

4. Co-pending application Ser. No. 008,033 filed concurrently herewith, entitled "Method For Developing Automatic Replies in an interactive Electronic Calendaring System," and assigned to the assignee of the present application is directed to an electronic calendaring method in which a calendar owner can respond automatically to requests for participation in events being calendared by another person. The nature of the reply is based on an analysis of the parameters set forth in the request and an algorithm employing a set of prioritized criteria that the calendar owner has established to provide the automatic response.

5. Co-pending application Ser. No. 008,036 filed concurrently herewith, entitled "Electronic Calendaring Method for Automatic Confirmation of Resource Availability During Event Calendaring", and assigned to the assignee of this application is directed to an electronic calendaring method in which a calendar owner, when calendaring an event such as a meeting, which requires, in addition to a meeting room, such articles as a projector, video conferencing equipment, etc., automatically receives confirmation that requested articles are available and reserved for the calendared meeting event.

BACKGROUND ART

The prior art has disclosed a number and variety of interactive electronic calendaring systems and method. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network that has been established to permit the users to interact with each other and with data maintained on the data processing system. In this environment, a user at a terminal or workstation can send a message to one or more of the other users on the network and is notified when the addresses has received and read the message.

In most of these environments, each user generally maintains a calendar, and in many of these environments the reason for the interaction with each other quite often generally involves reference to respective calendars. A considerable amount of time is therefore spent in many organizations, with people checking and rearranging their calendars to accommodate various events such as meetings, presentations, etc. In this environment, the calendar systems and method have progressed to the point where a person who is calling a meeting can at least review within the constraints that the security system dictates, the calendars of other users on the system that he intends to invite to a meeting, to determine whether a given time period is available on the respective calendars of the perspective attendees. However, once the meeting time is set and the prospective participants notified of the date, time, and subject of the meeting, each participant must update his own electronic calendar and reply to the meeting request. While the system can facilitate the request and reply message process, it is sometimes less frustrating when a negative reply has to be transmitted to merely use the telephone to arrive at another mutually convenient time. As a result, a considerable amount of time and effort is spent by calendar owners replying to requests for participation in events that are being calendared by other persons.

The cross referenced applications describe various improvements to electronic calendaring methods for increasing productivity and making the overall system more appealing to the calendar owner by providing functions that the calendar owner came to expect and rely on when his calendar was being kept manually.

In many situations it is desirable that the individual calendar owner have the ability to designate an alternate to attend a meeting in place of the designated invitee. This need arises for a number of different reasons other than the obvious one where the initial invitee cannot attend because of prior commitments. In many situations, the meeting originator may now know the name of the specific individual that should attend the meeting and therefore addresses the meeting notice/invitation to the manager of the department or function that should be represented.

In other situations the department manager wants to make the assignment on a meeting by meeting basis so has arranged to receive all notices for requests for participation by members of his function in events being calendared. He then must do his own manual type of scheduling and notify the meeting originator that while he will not attend this meeting an alternate will attend but that he still wants to be invited to the next meeting or that the assignment is permanent but he still wants to receive a copy of the notice. Such sub rosa arrangements between calendar owners eventually tend to destroy the usefulness of the system and severely weaken the integrity of its information.

The present invention overcomes the described problems and limitations of prior art electronic calendaring methods by providing a method in which a calendar owner can assign an alternate to any meeting to which he has been invited without in any way affecting his ability to receive notices of similar meetings in the future.

SUMMARY OF THE INVENTION

In order to minimize the time and effort involved by calendar owners in replying to requests for participation in a calendared event initiated by other calendar owners on the network, where the owner/invitee cannot or does not want to attend but instead wants to send an alternate, the present invention provides an electronic calendaring method in which a reply is developed either by the owner interactively or by the system automatically that reflects the invitees' intention not to attend the meeting but instead to send an alternate in his place. The method permits the owner to specify if the alternate is just for the specific meeting presently being calendared or also for future meetings which are related, by requesting that the alternate be classified as temporary or permanent.

The method establishes a data structure for storing with the list of names associated with the event being calendared, the role of each person that is to attend the meeting and their personal status. When an alternate is designated, the name of the alternate is added to the names list with the appropriate role and status data. The name of the owner/invitee remains on the names list associated with the event but the status and role data is modified to reflect that he will not attend this meeting but that an alternate will. If the event is cancelled or modified in any way which requires the originator to issue a new notice on the system, the notice is directed to both the original invitee and the alternate and the alternate is expected to respond if a response is required. The original invitee may designate that the alternate is a permanent alternate in which case all future notices which are related to the event will be directed to the alternate and the original invitee. In this way the original invitee may keep aware of the events being held should he decide to take some action relative to the event. The assignment of a permanent alternate is not the same as providing a permanent substitute since that latter action will operate to have his name removed from the list.

The automatic assignment of an alternate for a particular event can be setup in advance by the calendar owner. In this mode the owner establishes a number of criteria in accordance with the method described and claimed in cross referenced application Ser. No. 088,033 so that if these criteria are met a preestablished alternate is assigned with the predetermined role and personal status data. The alternate is preassigned by the calendar owner interactively by displaying an option on the screen presented to the owner for setting up automatic replies that allows selection of this function and solicits entry of the required information about the alternate.

This latter feature can be extended to responses to notices sent to calendar owners which are not individuals but are event supporting resources, such as conference rooms. This permits a calendar owner to receive an automatic reply designating a different conference room than he originally specified in the meeting notice when for some reason the original is not available. Appropriate fields in the Automatic Response data structure are provided for storing this data in the system to permit the automatic reply to be developed under the proper circumstances.

It is therefore an object of the present invention to provide an improved electronic calendaring method.

A further object of the present invention is to assist owners of electronic calendars in scheduling calendared events which involve participation of a number of other calendars owners.

A further object of the present invention is to provide an improved electronic calendaring method in which a reply by a calendar owner to a request to participate in an event being calendared by another calendar owner can reflect the fact that a specific named alternate is to attend the event in place of the original invitee.

A still further object of the present invention is to provide an electronic calendaring method in which a calendar owner can establish an automatic reply to other calendar owners meeting requests, the nature and content of which reflects that a designated alternate is to attend the meeting and his role and status relative to the meeting being calendared and future related meetings depend upon information supplied in the present response.

Objects and advantages, other than those mentioned above, will become apparent from the following description when read in connection with the drawing.

BRIEF DESCRIPTION OF THE DRAWING

FIG. 3 illustrates the display screen that is employed in connection with the method of the present invention for entering information interactively into the system relative to an automatic response and a designated alternate.

FIG. 4a-4c illustrate display screens that are employed by a calendar owner during the process of calendaring an event on his calendar.

BRIEF DESCRIPTION OF THE PREFERRED EMBODIMENT

Figure 1:
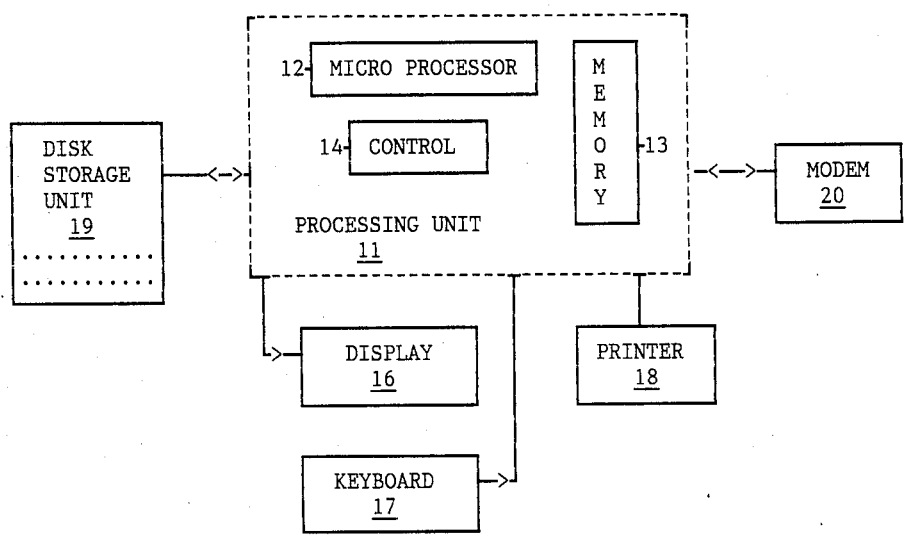
FIG. 1 is a block diagram of an interactive data processing terminal in which the method of the present invention may be advantageously employed.

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the micro processor block 12 and the memory unit 13.

The terminal further includes a group of conventional peripheral units including a display device 16, a keyboard 17, a printer 18, a disk storage unit 19, and a modem 20. Since the details of the above described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. Lastly, the modem 20 functions to transfer data from the terminal of FIG. 1 to a host system through one or more communication links which may be a commercial type link or a dedicated communication link.

Figure 2:
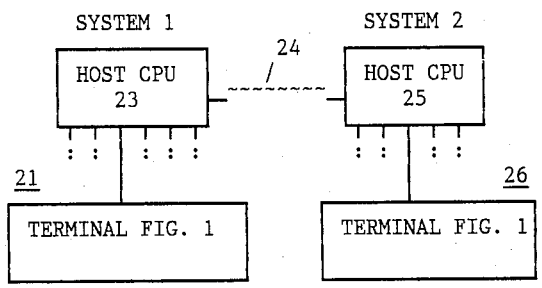
FIG. 2 is a block diagram of the network of terminals of the type shown in FIG. 1.

FIG. 2 illustrates a network 21 of interactive type workstations of the type shown in FIG. 1. As illustrated, the network includes a plurality of terminals which are interconnected with each other and to a host central processing unit 23, which in turn is connected via communication link 24 to a second host processing unit 25, which also connects to another network 26 of interactive workstations. Functionally, the system operates to allow one terminal to communicate to one or more other terminals using established communication protocols, so that the various serially connected communication links are transparent to the operator.

Such systems are well known in the art, and are currently in extensive commercial use. Since these communication links per se are not part of the present invention, only those details that are necessary for an understanding of the calendaring method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual calendar owners and shareable resources such as meeting rooms, etc., which require scheduling.

The system shown in FIG. 2 processes information as various types of data objects such as text data objects, graphic data objects, and calendar data objects. Each of these data objects are represented by a datastream which comprises a series of structured fields.

A calendar object datastream has the following sequence of structures.

---

Begin Document (BDT)
  Begin Page (BPG)
    Begin Calendar Data (BCL)
      Calendar Data Descriptor (CDD) (Optional)
      Calendar Data SF (CAD)
      Calendar Structures (COCA)
    End Calendar Data (ECL)
  End Page (EPG)
End Document (EDT)

---

The format of the datastream for other type data objects contain the begin document, begin page, end page, and end document data structures. Structured fields corresponding to those listed above for a calendar object are also employed for other type objects.

A structured field is a self-describing entity which contains related groupings of parameter values and triplets. The structured field, as shown below, has two parts: the Structured Field Introducer and the Structured Field Content.

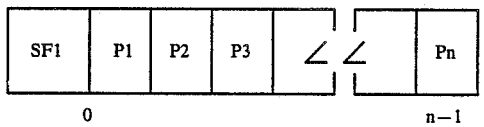

The structured field begins with a Structured Field Introducer. The syntax and semantics of the Structured Field Introducer are defined by the architecture which governs the datastream in which the structured field is found. The Structured Field Introducer contains as the first two bytes a parameter which defines the length of the structured field. It also contains an identification code which uniquely identifies the structured field.

The Structure Content portion of each structured field contains structures and triplets, which give the structured field its meaning. Parameters in the triples define the attributes of the Calendar Object. Every parameter has a value either explicitly appearing in a triplet, inherited from a control structure in the datastream's hierarchy, or implicitly defined as a default. This default may also be the alternate action value.

Every structure is either required or optional. A required structure appears in the object because the function of that structure is required and for proper performance of the function a value is necessary.

An optional structure need not appear in the object either because the function of that structure is not required or because the function is required, but default values are acceptable for all parameters.

As shown above, a calendar data (CAD) structured field (SF) precedes the actual calendar data. A calendar data descriptor (CDD) SF can precede the CAD SF to provide formatting information for the data that follows.

Calendar data comprises named data structures and named triplets which are composed of parameters. A parameter is a variable to which a value is assigned. Parameters can be optional or required. Parameters are also classified as terminal or non-terminal. A terminal parameter is merely the last parameter in a string of parameters.

A parameter can have one of three types of values assigned.

1. NUM—This is a number or a numerical value.
2. COD—This is a code assigned a specific meaning.
3. BST—This is a bit string of binary elements, each of which is usually independent.

In the following discussion it will be assumed that a byte comprises 8 bit positions numbered 0-7 from left to right, with position 0 being the high order position. Bit position 0 represents $2^{}7$ (2 to the 7th power), while bit 7 represents $2^{}0$ (2 to the 0 power).

The various calendar structured fields and calendar triplets are defined by the following type of table.

| BYTES | NAME | TYPE | MIN | MAX | LGTH | OPT |
|-------|------|------|-----|-----|------|-----|
| n-m   | name | type | v   | x   | www  |     |

In the FIGURE:
BYTES refers to the position, indexed on zero.
NAME is the name by which reference is made to the parameter.
TYPE denotes the syntax of the parameter by "type," The architected types NUM, COD, and BST were described earlier.
LGTH denotes the length of the field in terms of the exact number of bytes or the maximum number of bytes permitted.
OPT refers to the optionality of the parameter's appearance in the structure or triplet:
O means that the parameter is optional.
R means that the parameter's appearance is required.
If a required parameter is missing, an exception condition exists. The alternate action is to ignore the structure, self-defining field, or triplet to which the missing parameter belongs.
Syntactically descriptive material below the FIGURE indicates what additional restrictions apply to the structure or triplet defined by the FIGURE.
Calendar structures and calendar triplets which are relevant to the present invention will be described using the above-described format. After the structures are described, the display screens that are presented to calendar owners by the system in order to solicit information when a calendar owner wants to perform a calendaring function will be described. A flow chart setting forth the detailed steps of the method of the present invention will then be described in connection with the program listing of pseudocode that will assist persons skilled in programming interactive terminals to implement the method of the present invention.
Since the Automatic Response function operates in response to an invitation to an event being calendared by another calendar owner, it is necessary to describe in detail the data structures that are employed by the system in the process of an owner calendaring an event on his calendar. In the preferred embodiment, calendar entries are classified into a number of different types. Since the system contemplates interchanging calendar data throughout the system, including terminals that are remotely connected, such as those shown in FIG. 2, entry types and presentation language are controlled by a defined architecture.
While the same display screen may be employed to solicit the data for a number of different event types, the data structures and triplets, required or optional, will vary by event type.
While some of the structures to be described and the triplets associated with these structures are not directly involved in the "Automatic Response" function, they have been described in order to provide background for the reader and a basis for a comprehensive understanding of the claimed process and its relationship to the processes described and claimed in the cross-referenced application.
The various calendar object data structures to be described are preceded by a calendar data structure shown below.

| CALENDAR DATA (CAD) STRUCTURE FIELD (SF) | | | | | | |
|---|---|---|---|---|---|---|
| BYTES | NAME | TYPE | MIN | MAX | LGTH | OPT |
| 0-1 | Structured Field Length | NUM | 8 | 32767 | 2 | R |
| 2 | Structured Field Type1 | COD | X'D3' | X'D3' | 1 | R |
| 3 | Structured Field Type2 | COD | X'EE' | X'EE' | 1 | R |
| 4 | Structured Field Type3 | COD | X'5B' | X'5B' | 1 | R |
| 5 | Flags | BST | 0 | 0 | 1 | R |
| 6-7 | Segment Sequence Number | NUM | 0 | 32767 | 2 | R |
| 8-7+n | Calendar Data | * | * | | n | R |

*Values depend on the Calendar Object structure and triplet specification.

The Calendar Data SF (CAD) identifies the data as calendar data and specifies the length of the calendar data. The Calendar Data SF contains, for example, up to 32767 bytes of calendar structures and calendar triplets (called "Calendar Data"). Calendar data varies with the function employed by the generator of the object.

MAJOR CALENDAR STRUCTURES DESCRIPTION

This section describes the major structures that are involved in the present invention. The structures consist of a mixture of calendar triplets. The triplets are described in the Calendar Triplets Description section that follows this section.

The calendar structures are preceded by the Calendar Data Structured field (CAD). Parameter values specified by the system can be overridden by parameters specified in calendar data. For example, the Code Page of Symbols for Displaying and Printing Data.

In the structure description, bits are consecutively numbered from left to right starting with zero.

The format for all of the structures is the same. The format is shown below.

| BYTES | NAME | TYPE | MIN | MAX | LGTH | OPT |
|---|---|---|---|---|---|---|
| 0-1 | LENGTH | NUM | | | | R |
| 2-3 | TYPE | COD | | | | R |
| 4-n | TRPLT1 to TRPLTn | | | | | R | where
LENGTH=A two-byte value of the number of bytes in this structure including byte zero.
TYPE=A two-byte binary number that designates a specific structure function.
TRPLT1 TO TRPLTn=Calendar Structure Triplets.

The length of structures can vary depending on the number of triplets included.

If the length excludes all or part of an optional parameter in a triplet, then the value for that parameter and any parameters that follow are not changed; that is, the LENGTH field is used as specified.

If a structure is invalid or unsupported, an exception is raised.

If the length field excludes a required parameter or triplet, an exception is raised.

If a structure contains an invalid or unsupported parameter or triplet, an exception is raised.

MEETING (MTG) STRUCTURE

The meeting structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D#' | X'D3' | 1 | R |
| 3 | Structure Type2 | COD | X'85' | X'85' | 1 | R |
| 4-3+n | Meeting Triplets | | * | | n | R |

*Values depend on the triplet specification.

The MTG structure provides the field necessary to interchange meeting information, the scheduling of meetings and requests for meeting information. It also provides a specific search classification to allow building a composite calendar for a specified list of calendar owners.

The Valid MTG Triplets are listed below and defined in detail in the following section.

ERROR ACTION (EAC) - An EAC triplet may occur in any sequence and is optional.

STRUCTURE ID (SID) - The SID specifies the ID for the metering.An optional SID may be included to identify a Trigger (TRG) associated with the meeting.

DATE AND TIME (DTT) - The DTT triplet provides the meeting time(s) and date(s) and is required. DTT triplets must occur in ascending time(s) and date(s). A meeting that occurs at non-sequential times can be scheduled by using more than one DTT triplet specifying the required times.

NAME (NME) - Network Address (NAD), Postal Addresses (PAD) and User Status (UST) triplets may be used to provide user status and addresses for a named item. NME triplets and associated NAD, PAD and UST triplets may be included for both the CALLER (meeting owner) and the ARRANGER (meeting arranger). The Name Status byte specifies whether or not NAD, PAD and UST triplets follow the Name triplet which is optional.

USER STATUS (UST) - The UST triplet provides the role and status for the person named in the NME triplet. This triplet is only valid when it follows a NME triplet and is optional.

NETWORK ADDRESS (NAD) - The NAD triplet provides the network address for the person named in the NME triplet and is optional.

POSTAL ADDRESS (PAD) - The PAD triplet provides the mailing address for the person named in the NME trilet and is optional.

EVENT STATUS (EVS) - The EVS specifies the meeting status and is optional.

TIME STAMP (TMS) - Only one TMS triplet is allowed in the MTG structure and it is optional.

ENTRY SECURITY (ESL) - If this control is omitted the security level is PUBLIC. Only one ESL triplet is allowed in the MTG structure and it is optional.

SET CODED GRAPHIC CHARACTER SET GLOBAL ID (SCG) - The SCG selects the character set and code page for characters contained in the triplets that follow the SCG in the calendar structure. The Network Address character set and code page are not affected by the SCG. The active code page is restored automatically at the end of the calendar structure.

SUBJECT (SBJ) - The SBJ triplet contains character data describing the meeting subject. One SBJ triplet is allowed in each MTG structure and it is optional.

PLACE (PLC) - The PLC triplet contains character data describing the meeting location. One PLC triplet is allowed in each MTG structure and is optional.

DETAIL (DTL) - The DTL triplet contains character data describing the meeting. If the Code Page or character Set is changed in the meeting description, the DTL triplet must be ended, a SCG triple inserted, and another DTL triplet built. It is optional.

RSVP (RVP) - The RVP specifies the need for an attendance response from the meeting invitee and it is optional.

If a MTG structure is received without all required triplets, an exception exists. The default action is to skip the structure and continue processing. If a MTG structure contains an unsupported or invalid triplet, an exception exists. The default action is to skip the triplet and continue processing. If a MTG structure contains a DTT triplet with dates and times not in ascending order or if the optional SCG triplet occurs at a position that does not immediately precede a triple with text data (DTL, SBJ, PLC), an exception exists. The default action, in both cases, is to ignore the triplet and continue processing.

NAMES LIST (NML) DATA STRUCTURE

The names list data structure is shown below.

| BYTES | NAME | TYPE | MIN | MAX | LGTH | OPT |
| --- | --- | --- | --- | --- | --- | --- |
| 0-1 | Structure Length | NUM | * | 32767 | 2 | R |
| 2 | Structure Type1 | COD | X'D3' | X'D3' | 1 | R |
| 3 | Structure Type2 | COD | X'8A' | X'8A' | 1 | R |
| 4-3+n | NML Triplets | | * | * | n | R |

*Values depend on the triplet specification.

The NML structure provides the fields to support a name, associated addresses and status. The NML may contain a list of items, such as an invitees list, by concatenating Name (NME), Address (ADR) and User Status (UST) sequences. The list may include one or more than one name and associated information.

The following Valid NML Triplets for the NML DS were described in connection with the MTG structure.

ERROR ACTION, STRUCTURE ID, TIME STAMP, ENTRY SECURITY, SET CGCSGID, NAME, USER STATUS, NETWORK ADDRESS AND POSTAL ADDRESS.

The Date and Time (DTT) triplet is not valid.

The following triplet, however, is optional for the Names List data structure.

NAMES LIST TYPE (NLT) - Only one NLT triplet is allowed in the Names List structure. The NLT triplet specifies the type of data contained in the Names List. If the NLT is not specified, the list contains a list of names and or status and/or addresses that are not necessarily in one of the categories defined by the NLT triplet.

If a NML structure is received without a Structure ID triplet, an exception exists. The default action is to skip the structure and continue processing. If a NML structure contains an unsupported or invalid triplet, an exception exists. The default action is to skip the triplet and continue processing. Each sequence of the Names List structure triplets must occur in the listed order.

Optional triplets may be omitted from any sequence. If a NML structure is received with a triplet out of sequence, an exception exists. The default action is to skip the structure and continue processing. The above-described processing for handling exceptions is standard for most structures and therefore can be assumed for the following items.

VIEW SELECT (VSL) DATA STRUCTURE

The View Select data structure is shown below.

| BYTES | NAME | TYPE | MIN | MAX | LGTH | OPT |
| --- | --- | --- | --- | --- | --- | --- |
| 0-1 | Structure Length | NUM | * | 32767 | 2 | R |
| 2 | Structure Type1 | COD | X'D3' | X'D3' | 1 | R |
| 3 | Structure Type2 | COD | X'95' | X'95' | 1 | R |
| 4-3+n | VSL Triplets | | * | * | n | R |

*Values depend on the triplet specification.

The VSL structure provides a way to request calendar views for specific category(s) and timespan(s).

The Valid VSL Triplets previously described include the ERROR ACTION (EAC), USER DEFINED FIELD (UDF) and DATE and TIME (DTT) triplets.

The following triplet is also optional and valid.

ENTRY CATEGORY (ECT) - The ECT selects the category(s) for the calendar entry(s) to be selected in the view request. Only one ECT is allowed in a View Select structure. When more than one category is selected in the ECT, the view returned will contain the selected categories. If both the ECT and UDF triplet are omitted, all entries in the selected timespan will be returned.

The DTT triplet dates and times must occur in ascending order. The first DTT processed must provide the earliest data and time block. The last DTT processed must provide the latest date and time block. The first DTT also provides the begin date and time for the timespan selected.

When the optional ECT triplet is present, the VSL triplets must occur in the order ECT, DTT.

AUTO RESPONSE (ARS) DATA STRUCTURE

The Auto Response data structure is shown below.

| BYTES | NAME | TYPE | MIN | MAX | LGTH | OPT |
| --- | --- | --- | --- | --- | --- | --- |
| 0-1 | Structure Length | NUM | * | 32767 | 2 | R |
| 2 | Structure Type1 | COD | X'D3' | X'D3' | 1 | R |
| 3 | Structure Type2 | COD | X'72' | X'72' | 1 | R |
| 4-3+n | Auto Response Triplets | | * | * | n | R |

The ARS structure provides the fields necessary to interchange automatic response information. It allows the use of a network address(NAD), A Meeting or Appointment Structure ID (SID), A Priority (UDF) or a User Defined Field (UDF) specification to initiate an automatic response.

The valid ARS triplets include the following: ERROR ACTION (EAC,) SET CGCSGID (SCG), STRUCTURE ID (SID), NAME (NME), USER STATUS (UST), NET WORK ADDRESS (NAD), POSTAL ADDRESS (PAD), TIME STAMP (TMS),

ENTRY SECURITY (ESL), USED DEFINED FIELD (UDF), RESPONSE (RSP).

If a NAD, a SID, A PRIORITY UDF, or A UDF, received as part of an invitation and request to attend an event being calendared, satisfy the established Auto Response criteria, the response specified by the RSP triplet is sent automatically.

A separate ARS structure is required for each different set of ARS criteria.

A NAD triplet may also be used to identify the individual that will receive an established automatic response.

CALENDAR TRIPLETS DETAIL DESCRIPTION

This section describes in detail the set of calendar triplets that are the building blocks designed to be used by the Calendar Structures of the system including those described in the previous section.

The previous section indicated where these triples are valid.

The triplets are described in alphabetic order.

In the triplet descriptions, bits are consecutively numbered from left to right starting with zero.

The format for all of the triplets is the same and is shown below.

| BYTES | NAME | TYPE | MIN | MAX | LGTH | OPT |
|-------|------|------|-----|-----|------|-----|
| 0 | LENGTH | NUM | | | | R |
| 1 | KEYWORD | COD | | | | R |
| 2-n | PARM1 to PARMn | | | | | R | where:

LENTH = A one-byte value of the number of bytes in this triplet including byte zero.

KEYWORD = a one-byte binary number that designates a specific triplet function.

PARM1 to PARMn = Parameters containing the triplet settings.

The length of some triplets can vary depending on the number of parameters specified. If the length excludes an optional parameter or part of an optional parameter, then the value for that parameter and any parameters that follow are not changed; that is, the LENGTH field is used as specified. If a triplet is received in which the length exceeds the maximum value required to include all parameters, an exception is raised since the additional values are considered to be unsupported parameters. Also, if the length field excludes a required parameter, an exception is raised.

Since bytes 1 and 2 of all the triplets are identical, they are not shown for each triplet. Only bytes 2 through n will be described.

NETWORK ADDRESS (NAD) TRIPLET DATA STRUCTURE

The NAD triplet data structure is shown below.

| BYTES | NAME | TYPE | MIN | MAX | LGTH | OPT |
|-------|------|------|-----|-----|------|-----|
| 2-n | Network Address | COD | * | * | 16 | 0 |

The NAD triplet provides the Network Address for the item named in the (NME) triplet.

The NAD Parameters include,

NETWORK ADDRESS - This is the person's Network Address.
Bytes 2 through 9 = USER ID
BYTES 10 through 17 = NODE ID

POSTAL ADDRESS (PAD) TRIPLET DATA STRUCTURE

The PAD triplet data structure is shown below.

| BYTES | NAME | TYPE | MIN | MAX | LGTH | OPT |
|-------|------|------|-----|-----|------|-----|
| 2-n | Postal Address | COD | * | * | 1-253 | 0 |

The PAD triplet provides the Postal Address for the item named in the (NME) triplet.

The NAD Parameters include;

POSTAL ADDRESS - This is the person's Postal Address. Valid values are valid characters in the active or selected code page.

PROCESS ID (PRD) TRIPLET DATA STRUCTURE

The PRD triplet data structure is shown below.

| BYTES | NAME | TYPE | MIN | MAX | LGTH | OPT |
|-------|------|------|-----|-----|------|-----|
| 2-n | Process | COD | * | * | 1-16 | 0 |

The PRD triplet specifies the ID of a process such as a computer program.

The PRD Parameters include;

PROCESS — A 1 to 16 byte identifier. Valid values are valid characters in the active or selected code page.

CALENDAR SCOPE (CSC) TRIPLET DATA STRUCTURE

The CSC DP is shown below

| BYTES | NAME | TYPE | MIN | MAX | LGTH | OPT |
|-------|------|------|-----|-----|------|-----|
| 2-3 | Calendar Begin Day | NUM | 1 | 366 | 2 | R |
| 4-5 | Calendar Begin Year | NUM | −32K | 32767 | 2 | R |
| 6-7 | Calendar End Day | NUM | 1 | 366 | 2 | R |
| 8-9 | Calendar End Year | NUM | −32K | 32767 | 2 | R |

The CSC triplet defines the timespan supported by the calendar.

CSC Parameters

CALENDAR BEGIN DAY- The day of the year that the calendar timespan begins.

CALENDAR BEGIN YEAR - This is the begin year for the timespan supported in the calendar.

CALENDAR END DAY- The day of the year that the calendar timespan ends.

CALENDAR END YEAR - This is the end year for the timespan supported in the calendar.

CALENDAR TYPE (CTP) TRIPLET DATA STRUCTURE

The CTP DS is shown below

| BYTES | NAME | TYPE | MIN | MAX | LGTH | OPT |
|---|---|---|---|---|---|---|
| 2 | Type | NUM | 0 | 5 | 1 | R |

The CTP triplet specifies the calendar type. It is only valid when used in the Calendar Profile. It defines how to present an entire calendar.

CTP Parameters

TYPE - Specifies the calendar type such as Gregorian, Julian, Muhammadan, Jewish, Lunar, Shop.

DATE AND TIME (DTT) TRIPLET DATA STRUCTURES

The DTT DS is shown below.

| BYTES | NAME | TYPE | MIN | MAX | LGTH | OPT |
|---|---|---|---|---|---|---|
| 2 | Daylight Saving Indicator | NUM | 0 | 1 | 1 | R |
| 3 | Time Zone Indicator | NUM | −23 | 23 | 1 | R |
| 4-5 | Begin Date Day | NUM | 1 | 366 | 2 | R |
| 6-7 | Begin Date Year | NUM | −32K | 32767 | 2 | R |
| 8-9 | Begin Time | NUM | 0 | 86400 | 3 | R |
| 11-12 | End Date Day | NUM | 1 | 366 | 2 | O |
| 13-14 | End Date Year | NUM | −32K | 32767 | 2 | O |
| 15-17 | End Time | NUM | 0 | 86400 | 3 | O |
| 18-254 | Additional Date/Time Combinations | | | | | |

The DTT triplet specifies the dates and times for the associated triplets in the calendar structure.

DTT Parameters

DAYLIGHT SAVINGS INDICATOR - Specifies Daylight Savings time is active. This parameter, in conjunction with the Time Zone, identifies the time zone and allows the correct time zone label (i.e., CST or CDT) to be applied to the time.

TIME ZONE INDICATOR - The Time Zone Indicator is the displacement from Greenwich Mean Time (GMT) for the time specified. Values are specified in half hours from GMT to handle half-hour zones.

BEGIN DATE DAY - The day of the year when the event begins.

BEGIN DATE YEAR - The year the event begins.

BEGIN TIME - Begin Time specifies the event start time in seconds.

END DATE DAY - The day of the year when the event ends.

END DATE YEAR - The year the event ends.

END TIME - End Time specifies the event stop time in seconds.

Date is specified as a combination of two, two byte parameters (day of the year and year). Time is local time in seconds beginning at midnight. One Begin Date and Begin Time is required in each DTT triplet. The Begin and End, Date and Time sequence may be repeated if additional begin and end date and begin and end times are needed.

If more dates and times then can be sent in one DTT triplet are needed, additional DTT triplets can be included in the Calendar Structure. The only restriction is the byte structure length.

DETAIL (DTL) DATA STRUCTURE

The DTL DS is as follows.

| BYTES | NAME | TYPE | MIN | MAX | LGTH | OPT |
|---|---|---|---|---|---|---|
| 2-1 + n | Character String | COD | * | * | n | R |

The DTL triplet contains character data in the active or selected code page.

DTL Parameters

CHARACTER STRING - Text information associated with a calendar entry. Values are valid characters in the active or selected code page.

If the CGCSGID (SCG) is changed in a character string, the DTL triplet must be ended and another one built after inserting the SCG.

ENTRY CATEGORY (ECT) DATA STRUCTURE

The ECT DS is shown below.

| BYTES | NAME | TYPE | MIN | MAX | LGTH | OPT |
|---|---|---|---|---|---|---|
| 2-5 | Category | BST | | | 4 | R |

The ECT triplet provides a specific category for unavailable time and for open time on a calendar. The ECT triplet is used to specify calendar entry category(s) in requests and replies for both the Date and Time Map (DTM) and the View Select (VSL) structures ECT Parameter CATEGORY - A four byte, bit encoded value. Combinations of more than one category bit are allowed. The categories provide both request and response categories for both Date and Time Map (DTM) and View Select (VSL) calendar structures. Bits 0 through 20 may be used for both DTM and VSL categories. Bits 21 through 24 are used in View Select only. If they are used in a Date and Time Map, they are ignored.

BIT SIGNIFICANCE ENCODING

0=Holiday (General) - The owner will work on this holiday.

1=Holiday (Confirmed) - A confirmed calendar owner holiday.

2=Holiday (Tentative) - A tentative calendar owner holiday.

3=Vacation (Confirmed) - Confirmed calendar owner vacation.

4=Vacation (Tentative) - Tentative calendar owner vacation.

5=Offsite (Confirmed) - The calendar owner will not be at the normal work location and will not be available.

6=Offsite (Tentative) - The calendar owner has tentatively scheduled an activity away from the normal work location.

7=Not Normal Work Hours - Categorizes hours that are not normally worked.

8=Confirmed Meetings (Not Attended) - The calendar owner wil not attend.

9=Confirmed Meetings (Attended) - The calendar ownern will attend.

10=Confirmed Meetings (May Attend) - The calendar owner's status for this meeting is tentative.

11=Tentative Meetings (Not Attended) - The calendar owner will not attend.

12=Tentative Meetings (Attended) - The calendar owner will attend this meeting if it becomes confirmed.

13=Tentative Meetings (May Attend) - The calendar owner's status for this meeting is tentative.

14=Confirmed Appointments (Not Attended) - The calendar owner will not attend.

15=Confirmed Appointments (Attended) - The calendar owner will attend.

16=Confirmed Appointments (May Attend) - The calendar owner's status for this appointment is tentative.

17=Tentative Appointments (Not Attended) - The calendar owner will not attend.

18=Tentative Appointments (Attended) - The calendar owner will attend this appointment if it becomes confirmed.

19=Tentative Appointments (May Attend) - The calendar owner's status for this appointment is tentative.

20=Non-Scheduled Time - Identifies open time on the calendar. This category is most effective if used alone.

21=Date and Time Only (VIEW SELECT ONLY) - Selects date and time for all categories not specifically requested in a View Select.

22=Private Entry (VIEW SELECT ONLY) - Only date and time may be provided in the response to a calendar View Select request.

23=Calendar Comments (VIEW SELECT ONLY) - Character data entries.

24=Triggers (VIEW SELECT ONLY) - Entries that start a process and/or notify.

25-31=Reserved

If all Category bits are set to one in a request for a Date and Time Map, the information returned is meaningless because it includes both scheduled and non-scheduled time. The "Non-Scheduled Time" bit should be used carefully if it is used with other bits to obtain meaningful data. The "Not Normal Work Hours" bit should also be used carefully for similar reasons.

ENTRY CLASSIFICATION (ENC) DATA STRUCTURES

The ENC DS is as follows

| BYTES | NAME | TYPE | MIN | MAX | LGTH | OPT |
|---|---|---|---|---|---|---|
| 2-3 | Classification | BST | | | 2 | R |

The ENC triplet provides a specific Classification code for a calendar entry that occupies a block of time.

ENC Parameters

CLASSIFICATION - A two byte bit encoded value. Combinations of more than one Classification Bit are not allowed.

BIT SIGNIFICANCE ENCODING

0=Holiday - (General) The owner will work on this holiday.

1=Holiday - (Confirmed) A confirmed calendar owner holiday.

2=Holiday - (Tentative) A tentative calendar owner holiday.

3=Vacation - (Confirmed) Confirmed calendar owner vacation.

4=Vacation - (Tentative) Tentative calendar owner vacation.

5=Offsite - (Confirmed) The calendar owner will not be at the normal work location and will not be available.

6=Offsite - (Tentative) The calendar owner has tentatively scheduled an activity away from the normal work location.

7=Not Normal Work Hours - Identifies times that the calendar owner is normally not at work.

ERROR ACTION (EAC) DATA STRUCTURE

The EAC DS is as follows

| BYTES | NAME | TYPE | MIN | MAX | LGTH | OPT |
|---|---|---|---|---|---|---|
| 2 | Action | BST | | | 1 | R |

The EAC triplet specifies the action required when an exception is processed.

EAC Parameter

ACTION - The error action specification.

BIT

0=0 - (DEFAULT) Report the exception, take a default action and continue.

0=1 - Ignore the exception, take a default action and continue.

An EAC triplet may occur at any place in a calendar structure. If an error action is not specified, the default is to report the error, take a default action and continue.

The Error Action specified in a calendar structure remains active only until the structure and, at which time, the default Error Action becomes active.

EVENT STATUS (EVS) DATA STRUCTURE

The EVS DS is as follows.

| BYTES | NAME | TYPE | MIN | MAX | LGTH | OPT |
|---|---|---|---|---|---|---|
| 2 | Event Status | BST | | | 1 | R |

The EVS triplet provides status for an event such as an appointment or meeting.

EVS Parameter

EVENT STATUS - The status of an event.

BIT SIGNIFICANCE ENCODING

0=Confirmed (the meeting time has been established)

1=Tentative (the meeting is tentative)

2=Cancelled (the meeting was cancelled)

3=Postponed (the new date and time are not set)

4=Rescheduled (the meeting has been rescheduled)

5=Marked for Archive (entry will be saved for reference)

NAME (NME) DATA STRUCTURE

The NME DS is as follows.

| BYTES | NAME | TYPE | MIN | MAX | LGTH | OPT |
|---|---|---|---|---|---|---|
| 2 | Name Type | BST | | | 1 | R |
| 3 | Associated Triplets | BST | * | * | 1 | R |
| 4-n | Item Name | COD | * | * | 1-251 | R |

The NME triplet specifies a name of either a person or a calendar.

NME Parameters

NAME TYPE - Specifies the name type. Bits 1 and 2 are mutually exclusive. Only one of these bits may be set to 1.

BIT SIGNIFICANCE ENCODING

0=(0-Name is a personal name).
(1-Name is a calendar name).
1=1- Name is a primitive name not unique in a network
2=1- Name is a Nickname associated with a network address.
3-7=Reserved ASSOCIATED TRIPLETS - Bits set to 1 specify that User Status (UST), Network Address (NAD) and Postal Address (PAD) triplets may follow the NME triplet in any order.

0=A User Status (UST) triplet follows that specifies the named item's role and status.
1=An Network Address (NAD) triplet follows that specifies the named item's network address(s).
2=A Postal Address (PAD) triplet follows that specifies the named item's postal address(s)

ITEM NAME - Specifies the name of a person or calendar. Values are valid characters in the active or selected code page. The maximum name size is 251 bytes.

The item named by the NME triplet may be further identified using the User Status (UST),the Postal Address (PAD) and the Network Address (NAD) triplets.

The NME triplet must be preceded with an SCG triplet if the characters used are not on the active code page.

NAMES LIST TYPE (NLT) DATA STRUCTURE

The NLT DS is as follows.

| BYTES | NAME | TYPE | MIN | MAX | LGTH | OPT |
|---|---|---|---|---|---|---|
| 2-3 | List Type | BST | | | 2 | R |

The NLT triplet specifies the type of data contained in a list.

NLT Parameter

LIST TYPE - Specifies the list type. Combinations of bits are allowed.

BIT SIGNIFICANCE ENCODING

0=The list contains names and associated Network Addresses.
1=The list contains Nicknames and associated network addresses.
2-15 Reserved.

The lists may optionally contain postal addresses and user status. The NLT triplet describes the list contents for specific list types. Lists containing the NLT are constrained to the specified contents. If the NLT is omitted the lists may contain any valid combination of names, user status and addresses.

PLACE (PLC) DATA STRUCTURE

The PLC DS is as follows:

| BYTES | NAME | TYPE | MIN | MAX | LGTH | OPT |
|---|---|---|---|---|---|---|
| 2-n | Location | COD | * | * | 1-253 | R |

The PLC triplet specifies a location for an event such as a meeting or appointment. The location is described using text characters. The maximum location length is limited to 253 text bytes.

PLC Parameters

LOCATION - Location specifies the event location.

RESPONSE (RSP) DATA STRUCTURE

The RSP DS is as follows:

| BYTES | NAME | TYPE | MIN | MAX | LGTH | OPT |
|---|---|---|---|---|---|---|
| 2 | RESPONSE | BST | | | 1 | R |

The RSP triplet establishes a response that will be sent automatically as part of the AUTO RESPONSE data structure.

RSP Parameter

RESPONSE - Specifies what response will be sent. The Alternate indication may use any other bit

BIT SIGNIFICANCE ENCODING

0=No Action - Auto response is deactivated.
1=Confirmed - The invitee will attend.
2=Tentative - The invitee may attend.
3=Not Attending - The invitee will not attend.
4=User Acknowledge - The schedule request was received.
5=Alternate - The response is from the invitee's alternate.

RSVP (RVP) DATA STRUCTURE

The RVP DS is as follows

| BYTES | NAME | TYPE | MIN | MAX | LGTH | OPT |
|---|---|---|---|---|---|---|
| 2 | RSVP | BST | | | 1 | R |

The RVP triplet indicates that an attendance response is required.

RVP Parameter

RSVP - Specifies the need for a response to a meeting schedule request.

BIT SIGNIFICANCE ENCODING

0=No attendance response is required.
1=An attendance response is required using the NML structure.

SET CODED GRAPHIC CHARACTER SET GLOBAL ID (SCG) DATA STRUCTURE

The SCG DS is as follows:

| BYTES | NAME | TYPE | MIN | MAX | LGTH | OPT |
|---|---|---|---|---|---|---|
| 2-3 | GCSGID | NUM | 1 | 65534 | 2 | R |
| 4-5 | CPGID | NUM | 1 | 65534 | 2 | R |

The SCG triplet specifies the coded graphic character set global identification that is used to map subsequent text into presentable graphics.

The CGCSGID that is specified by the system selects the active Character Set and Code Page. If the CGCSGID is not specified the default Character Set and Code Page specified are used.

SCG Parameters

CGCSGID - Coded Graphic Character Set Global ID; a concatenation of 2 two-byte numbers. The first two bytes identify the Graphic Character Set Global ID (GCSGID) expressed as a binary value. The second two bytes identify the Code Page Global ID (CPGID) expressed as a binary value.

GCSGID - Graphic Character Set Global ID.
CPGID - Code Page Global ID.

GCSGID and CPGID are used to determine how coded text characters are translated to the graphic characters to be presented.

The SCG will only select a code page for the triplet that immediately follows it. If structures containing text characters on a code page that is different from the default code page are concatenated, a separate SCG is required preceding each structure.

The SCG has no affect on the NETWORK ADDRESS in the UDF triplet and the USER CODE in the UDF triplet.

STRUCTURE ID (SID) DATA STRUCTURE

The SID DS is as follows:

| BYTES | NAME | TYPE | MIN | MAX | LGTH | OPT |
|-------|------|------|-----|-----|------|-----|
| 2 | ID Type | BST | | | 1 | R |
| 3-n | Identifier | COD | * | * | n | R |

The SID triplet provides an identifier for calendar structures.

SID Parameters

ID TYPE - Specifies the ID type

BIT SIGNIFICANCE ENCODING

0 = Entry ID - Identifies a calendar entry
1 = Names List ID - Identifies a list of names
2 = Trigger ID - Identifies a trigger
3 = Profile ID - Identifies a calendar profile
4 = Auto Response - Identifies an automatic response IDENTIFIER - 1 to 44 character identifier.

The SID provides a correlation ID to accomplish calendar updates from an intelligent workstation to a host, to correlate responses to a meeting notice with the meeting names list and to correlate notification of a list of people associated with a meeting or a list.

SUBJECT (SBJ) DATA STRUCTURE

The SBJ DS is as follows:

| BYTES | NAME | TYPE | MIN | MAX | LGTH | OPT |
|-------|------|------|-----|-----|------|-----|
| 2-n | Event Subject | COD | * | * | 1-253 | R |

The SBJ triplet specifies the subject for an event. The subject is described using text characters.

SBJ Parameters

EVENT SUBJECT - This parameter specifies the event subject.

TIME STAMP (TMS) DATA STRUCTURE

The TMS DS is as follows.

| BYTES | NAME | TYPE | MIN | MAX | LGTH | OPT |
|-------|------|------|-----|-----|------|-----|
| 2 | Daylight Savings Indicator | NUM | 0 | 1 | 1 | R |
| 3 | Time Zone Indicator | NUM | -23 | 23 | 1 | R |
| 4-5 | Begin Date Day | NUM | 1 | 366 | 2 | R |
| 6-7 | Begin Date Year | NUM | -32K | 32767 | 2 | R |
| 8-10 | Begin Time | NUM | 0 | 86400 | 3 | R |
| 11 | Network Address Length | NUM | 0 | 128 | 1 | O |
| 12-n | Network Address | COD | | | ~128 | O |

The TMS triplet specifies an entry's time zone, creation date and time and the entry creator's network address.

TMS Parameters

DAYLIGHT SAVINGS INDICATOR - Specifies Daylight Savings Time is active. This parameter, in conjunction with the Time Zone, identifies the time zone and allows the correct time zone label (i.e.,. CST or CDT) to be applied to the time.

TIME ZONE INDICATOR - The Time Zone Indicator is the displacement from Greenwich Mean Time (GMT) for the time specified. Values are specified in half hours from GMT to handle half hour zones.

BEGIN DATE YEAR - The year the event begins.

BEGIN TIME - Begin Time specifies the event start time.

NETWORK ADDRESS LENGTH - The Network Address length

NETWORK ADDRESS - System address
Bytes 12 thru 19 = USER ID - valid characters in CP256, CS930.
Bytes 20 thru 27 = NODE ID - valid characters in CP256, CS930.
Bytes 28 thru 139 = Reserved to support additional address.

USER DEFINED FIELD (UDF) DATA STRUCTURE

The UDF DS is as follows:

| BYTES | NAME | TYPE | MIN | MAX | LGTH | OPT |
|-------|------|------|-----|-----|------|-----|
| 2 | Priority | NUM | 1 | 10 | 1 | R |
| 2-9 | User Code | COD | * | * | 1-8 | R |

The UDF triplet provides a priority and user defined field that is assigned by the calendar owner. The assigned code provides additional entry categories.

UDF Parameters

PRIORITY - A one byte field that specifies a priority value for a calendar entry. 1 is the highest and 10 is the lowest priority.

USER CODE - An eight byte user defined code.

USER STATUS (UST) DATA STRUCTURE

The UST DS is as follows:

| BYTES | NAME            | TYPE | MIN | MAX | LGTH | OPT |
|-------|-----------------|------|-----|-----|------|-----|
| 2     | Role            | COD  | 0   | 7   | 1    | R   |
| 3     | Personal Status | COD  | 0   | 5   | 1    | R   |

The UST triplet provides information regarding the person named in the Name (NME) triplet. It provides the named persons Role and Personal Status.

UST Parameters

ROLE - Specifies the persons role regarding the event.

VALUES

0=Caller - Person has called the event.
1=Arranger - Person is arranging the event.
2=Invitee (Default) - Person has been invited to the event.
3=Mandatory Invitee - Person who must attend the meeting.
4=Alternate - Person replacing an invitee for attendance consideration on a temporary basis.
5=Additional Attendee - Person who is adding themselves to the distribution list associated with a group meeting.
6=Receives Copy - Person who receives event information.
7=Receives Blind Copy - Person who receives event information only, whose name will not appear on the distribution list.
8=Permanent Alternate - Person replacing the invitee for attendance on a permanent basis.

PERSONAL STATUS - The status associated with the name.

VALUES

0=No Action (no status has been received)
1=Confirmed (the person will attend)
2=Tentative (the person might attend)
3=Not Attending (the person will not attend)
4=User Acknowledge (received the invitation)
5=Alternate (the invitee will not attend, but an alternate may)

WORK TIMES (WTM) DATA STRUCTURE

The WTM DS is as follows:

| BYTES  | NAME                              | TYPE | MIN | MAX   | LGTH | OPT |
|--------|-----------------------------------|------|-----|-------|------|-----|
| 2      | Daylight Savings Indicator        | NUM  | 0   | 1     | 1    | R   |
| 3      | Time Zone Indicator               | NUM  | −23 | 23    | 1    | R   |
| 4-6    | Begin Time                        | NUM  | 0   | 86400 | 3    | R   |
| 7-9    | End Time                          | NUM  | 0   | 86400 | 3    | R   |
| 10-254 | Additional Begin/End Time Combinations | | | | | |

The WTM triplet specifies the work times for an associated calendar. Time is local time in seconds beginning at midnight.

WTM Parameters

DAYLIGHT SAVINGS INDICATOR - Specifies Daylight Savings Time is active. This parameter, in conjunction with the Time Zone, identifies the time zone and allows the correct time zone label (i.e., CST or CDT) to be applied to the time.

TIME ZONE INDICATOR - The Time Zone Indicator is the displacement from Greenwich Mean Time (GMT) for the time specified. Values are specified in half hours from GMT to handle half hour zones.

BEGIN TIME - Begin Time specifies the time block begin in seconds.

END TIME - End Time specifies the time block end in seconds.

One Begin Time and End Time is required in each WTM triplet. The Begin and End Time sequence may be repeated if additional begin and end times are needed.

THE PROCESS OF CALENDARING EVENT

FIG. 4b is a screen that is displayed to the operator/calendar owner in response to the operator indicating to the system that he wants to calendar an event. This can be accomplished, for example, by selecting item 1 from the master menu shown in FIG. 4a. Assume that a meeting is scheduled at 10 a.m. on Thursday, Oct. 7, 1986, and that the notice for the meeting is to be issued through the electronic calendaring system. The owner then enters the information into the system, implying the screens of FIGS. 4b and 4c. To identify the event type after selecting option 1 on screen 4a, the operator merely presses the enter key since the cursor has automatically been positioned at the event e.g., "meeting" on the screen of FIG. 3b. The next data entry as shown involves assigning a priority to this event. The valued to be entered is a value from 1-10 as indicated on the line following the blank for the value. The function of the priority numbers is to establish the relative importance of this event when viewed with regard to other commitments which are either planned or anticipated. This entry of a priority value is optional since the system will establish a default priority for the event according to some predetermined criteria which has been established for all calendar owners or alternately which gives you a unique default for each specific individual.

The assignment of a priority value to a calendar event either explicitly by the calendar owner or implicitly by the system is a necessary step in the view select process implementing in accordance with the method and described and claimed in cross reference application Ser. No. 008,034. The function of the priority value is described in detail in that application.

The user defined field, as shown in FIG. 4b is not used in the present example. Its function is to provide a field which the user or the user community can employ for some predefined purpose. The event identifier is the official name of the meeting. The date and time of the meeting are entered next.

The next entry on the screen is the names list. All the persons that are invited to attend the meeting have been listed in a names list along with their user ID, network and/or postal addresses and that list is assigned a name. The information is stored in the names list data structure described earlier so that in the case of regularly scheduled meetings, the meeting caller only needs to identify the name of the names list.

The next entry is for the name of the person calling the meeting. The last two entries are to identify the subject of the meeting and its physical location, such as a conference room.

FIG. 4c is the last screen employed in calendaring and event. This screen allows an event to be assigned a security classification and to indicate if the meeting is tentative or confirmed. The remaining portion of the screen shown in FIG. 4c is for establishing a trigger reminder for the event which is the subject matter of cross reference application Ser. No. 008,034.

After all the data is entered defining the event, the calendar owner advises the system to send the meeting information that has just been entered to each of the individuals listed in the names lists. This is done in the example shown by keying the program function key PF5.

The data defining the meeting particulars that were entered into the system is stored in the appropriate data structures and triplets described earlier. These data structures are transmitted to each invitee on the system in accordance with the protocols established for the calendaring system and the interchange between two different calendaring systems.

The invitee calendar owner is required to respond to the meeting notice since every meeting notice contains an RVP triple indicating that a response is required.

If the invitee/owner has not established an automatic response for this notice, then the response must be entered manually. Any of the prior art methods for manually responding to a meeting notice by the invitee may be employed. For example, the screen employed for calendaring an event or one similar to that screen, may be presented to the invitee with the program function key programmed to enter the invitees' response. Alternately a special screen can be presented providing a response field for the event. The response that is entered is stored in the personal status field of the user status triplet that is associated with the invitees' name in the names list. That data structure is returned to the meeting caller and stored in the names list data structure for the identified meeting.

It should be assumed in the following discussion that a calendar owner has decided for a number of reasons that invitations or requests for involvement in events being calendared by selected calendar owners or selected meetings and appointments or other criteria are to be responded automatically. In order to establish automatic responses, the calendar owner selects item 5 from the master menu shown in FIG. 4a. The auto response screen, shown in FIG. 3, is then presented. If the invitee decides that he will always attend the meetings that are identified by "D35 Meeting A1" then that ID is entered on the line in FIG. 3 following the legend Meeting Name.

The invitee also enteres the response that he wants sent which, in accordance with the initial assumption, is that he will always attend. The data that is entered into the system interactively when the auto-response screen is being displayed is stored in the Automatic Response data structure ARS previously described. By pressing program function key PF12 a second set of data for an automatic response can be entered. The system is designed to accommodate a reasonable number of criteria sets.

Entry of more than one criteria in FIG. 3 is interpreted by the system as a "logical and" situation in that a notice must contain all the criteria that was entered on the one screen before the response will be automatically dispatch.

The selection of option 5 i.e. Alternate, causes the data employed to identify the person who the invitee wants to designate to be highlighted. The data includes for example the Alternate's Name, User ID, System ID and Postal Address. In addition the invitee has the option to designate the named individual as a permanent Alternate by entering "Yes" after the question "Is this permanent?"

The data which identifies the Alternate is stored in the Name triplet associated with the ARS structure and the various triplets that accompany the Name triplet such as the User Status triplet. The Role parameter of the UST triplet is used to identify the person as a permanent or temporary Alternate. If the person is designated as a permanent Alternate his name is added to the Names List and he is identified as the permanent Alternate. This results in both he and the initial invitee being sent meeting notices with the responsibility to respond now being primarily on the Alternate. If he is only a temporary Alternate his name is not added to the Names List but is kept with the meeting notice in the event there is any change in the meeting status.

The system is arranged so that the host maintains each calendar owner's calendar so that when the owner's workstation is not turned on, his calendar is still available to the other individuals on the system. When a meeting notice is sent to the invitee, the system first checks to see if that invitee/owner has established any automatic response entries. If the system finds that automatic response structures exist, than a comparison is made between the data contained in the meeting notice and the data entered as criteria in the auto-response data structure. Specifically, the meeting name i.e., the event identifier for the meeting notice, is compared against the data entered in the ARS data structure in the identifier field of the SID triplet. In a similar manner, the user status triplet associated with the names list identifies the meeting caller by the placement of a 0 in the row field of that triplet. The name of the meeting caller is then compared against the name and user status triplet associated with the ARS data structure, this name having been previously stored in this data structure when the invitee was entering criteria in the Automatic Response frame. When the comparison operation indicates a match, then the response stored in the personal status field of the User Status data structure associated with the ARS structure is sent to the meeting caller automatically.

Figure 5:
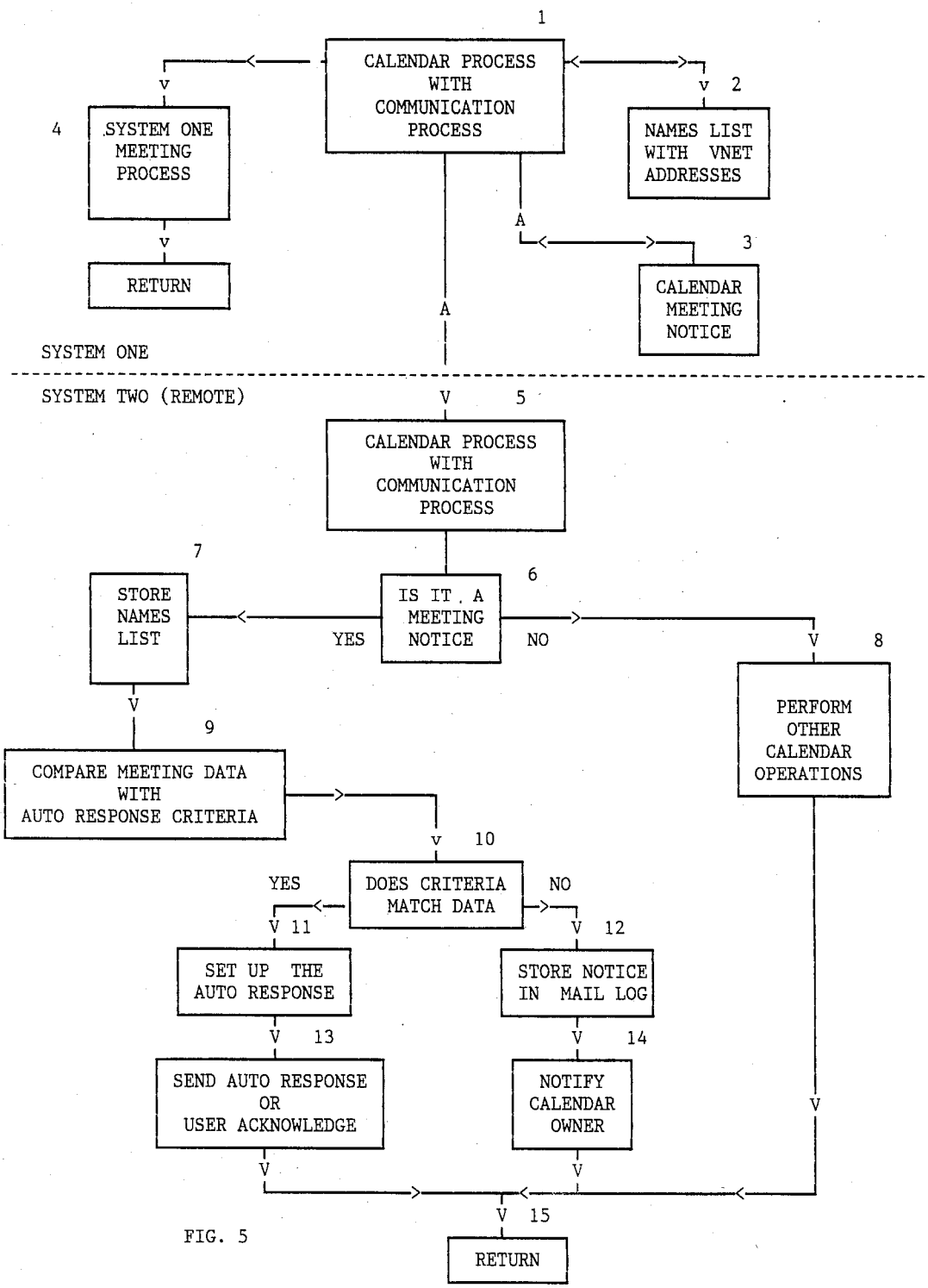
FIG. 5 is a flow chart illustrating various detailed steps of the improved electronic calendar method involved in developing a reply that reflects the designation of an alternate.

The above-described operation has been summarized in the flow chart of FIG. 5.

The following listing of programming type statements in pseudo code is provided to enable those persons skilled in the art of programming interactive type systems to have a detailed understanding of the various steps that are involved in providing an automatic response in an electronic calendaring system.

The first section is directed to the process of establishing criteria by the calendar owner which will provide the automatic response to an invitation to attend a meeting being called by another calendar owner.

```
1  DO
1   Select the Automatic Response in the master menu and hit
      enter
1  ENDDO
1  DO UNTIL
1   Enter any combination of Meeting ID, Meeting Caller Name,
      User ID, System ID, Used Defined Field, and User Priority
2    DO
2     Select and enter a response number(0=No Response;1=
        Confirmed(Will Attend); 2=Tentative(May Attend); 3=
```

```
        Not Attending: 4=User Acknowledge; 5=Alternate;
        8=Permenant
    2   ENDDO
```

The following code section is directed to setting up the data which identifies the assignment of an Alternate

```
    3   IF
    3       An alternate is selected enter the Alternate's Name. User
                ID, System ID and Postal Address; and Role status
    3       IF
    3           Finished setting up Alternates, hit PF9 to file and return
                to Master Menu. Store data in ARS structure.
    3       Else
    3           Hit PF12 to file and display the next Automatic Response
                template. Store data in ARS structure and display new
                template
    3       ENDIF
    2   ENDIF
    1   ENDDO UNTIL
```

The following code is directed to the process of developing an automatic response to a meeting notice. It begins with the receipt of a meeting notice. The automatic response does not consider whether the meeting is tentative or confirmed if the calendaring method permits the meeting to be so classified. Both are handled in the same manner.

```
    1   Do
    1       Compare the received Meeting notice data to the Auto
            response criteria that is stored in the Automatic Response
            Structure
    1       ENDDO
    1       IF the established criteria matches meeting notice data
    1       THEN
                Set up the associated response in the Automatic Response
                Structure. Place the meeting notice data on the receivers
                calendar with the appropriate meeting status(confirmed or
                tentative)
                Establish the response status in the meeting's Names List
    1       Else place the meeting notice in the receivers mail queue and
                notify owner of meeting request
    1       ENDIF
    1       IF an automatic response other than User Acknowledge was
                setup
    1       THEN Send back the Automatic Response Structure to the
                Meeting Caller
    1       Else Send back a User Acknowledge
    1       ENDIF
```

While the invention has been shown and described with respect to a preferred embodiment, it should be understood that changes and modifications may be made therein without departing from the spirit of the invention or the scope of the appended claims.

We claim:

1. An electronic calendaring method for use in a data processing system having a plurality of interactive type work stations connected directly or indirectly to a host processing unit and in which a first calendar owner receives a response from a second calendar owner as a result of a meeting notice sent through said system to said second calendar owner at the time said first owner is calendaring a meeting type event, said method selectively developing said response automatically, based on criteria that are pre-established by said second owner, said method comprising the steps of;

(a) establishing a first data structure for use by said system during the calendaring of an event by said first owner including a plurality of fields for storing data relevant to said event, (b) establishing a second data structure for use by said system in developing an automatic response upon receiving said meeting notice from said first owner including a plurality of predefined fields for storing data entered into said system by said second owner including (1) criteria type data and (2) response type data which designates an alternate for said second owner to attend said meeting, (c) comparing said criteria type data stored in said second data structure to data stored in said first data structure when said meeting notice is received by said second owner, and (d) developing said response automatically to include the identity of said alternate when said comparing step indicates a predetermined relationship between one or more of said criteria type data and the corresponding respective data stored in said first data structure.

2. The method recited in claim 1 in which said step of developing said response automatically includes the step of responding to said first calendar owner in accordance with the response data stored in said second data structure.

3. The method recited in claim 2 in which each said workstation includes a display and keyboard and further including the step of displaying to said second calendar owner a criteria screen to assist said second owner to interactively enter said criteria type data and said response type data into said system through said keyboard.

4. The method recited in claim 3 further including the step of displaying to said first calendar owner a screen to assist said first owner to interactively enter said data relevant to said event through said keyboard.

5. The method recited in claim 4 further including the step of storing said criteria type data and said response type data entered into said system by said second owner in said plurality of predefined fields of said second data structure.

6. The method recited in claim 5 further including the step of storing said data relevant to said event entered into said system by said first owner in said plurality of fields of said first data structure.

7. The method recited in claim 6 in which said step of establishing said first data structure includes the step of establishing an event identifier field for storing a unique identifier for an event at the time said event is being calendared and said step of establishing said second data structure further includes the step of establishing one of said predefined fields for storing said unique identifier as one of said criteria type data.

8. The method recited in claim 7 further including the step of establishing a third data structure for storing a list of the names of selected calendar owners including their respective system addresses and a name for said list, and said step of establishing said second data structure further includes the step of establishing one of said predefined fields for storing the name of the meeting caller as one of said criteria type data.

9. The method recited in claim 8 in which said step of establishing said third data structure further includes the step of establishing a first field for each name on said list to store an indication of that owners role, and a second field for each said name on said list for storing an indication of that owners status and a third field for storing the ID of a calendared event with which said said third data structure is to be used.

10. The method recited in claim 9 in which said step of displaying to said second owner a criteria screen to assist said second owner to interactively enter said response type data into said system through said keyboard includes the step of displaying prompts which solicit the name and address of an alternate to attend said event and an indication as to whether the assignment is permanent.

* * * * *